Figure 1:
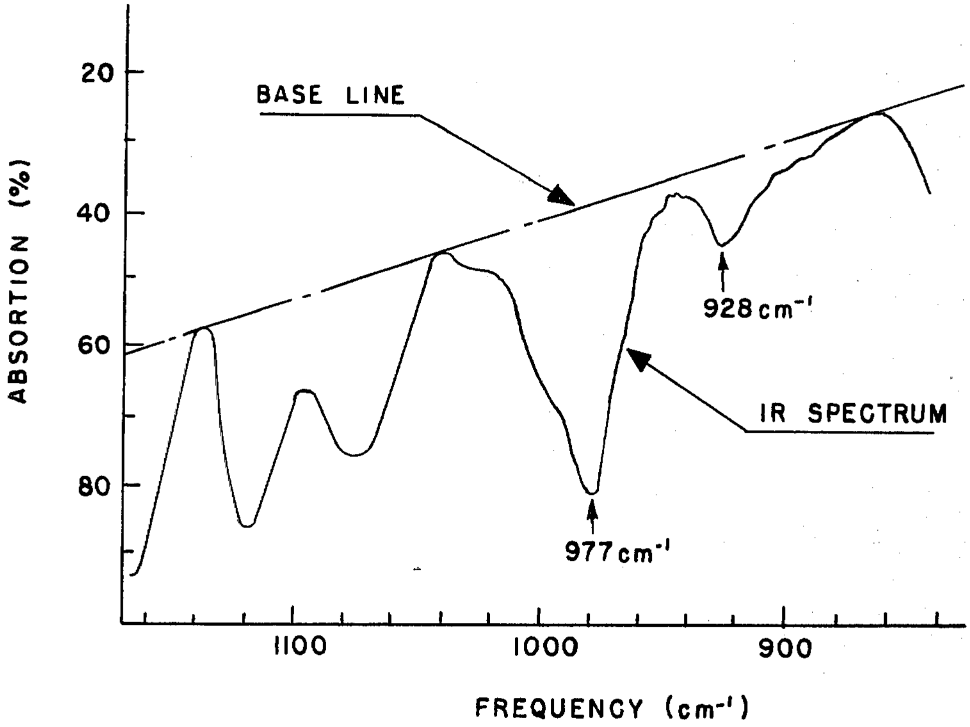

United States Patent [19]

Muraki

[11] 4,290,935

[45] Sep. 22, 1981

[54] HIGHLY RIGID POLYAMIDE COMPOSITION

[75] Inventor: Toshio Muraki, Nagoya, Japan

[73] Assignee: Toray Industries, Incorporated, Tokyo, Japan

[21] Appl. No.: 88,386

[22] Filed: Oct. 25, 1979

[30] Foreign Application Priority Data

Oct. 27, 1978 [JP] Japan ................................ 53-131562
Feb. 8, 1979 [JP] Japan ................................ 54-13729

[51] Int. Cl.³ ................................ C08K 5/20
[52] U.S. Cl. ................................ 260/32.6 NA; 260/37 N; 528/323; 528/488
[58] Field of Search ................................ 260/32.6 NA, 37 N; 528/323, 488

[56] References Cited

U.S. PATENT DOCUMENTS

| | | | |
|---|---|---|---|
| 3,017,392 | 1/1962 | Butler et al. | 528/323 |
| 3,325,455 | 6/1967 | Warner | 528/323 |
| 3,549,651 | 12/1970 | Oswald et al. | 260/37 N |
| 3,673,161 | 6/1972 | Sebenda et al. | 528/323 |

*Primary Examiner*—Lewis T. Jacobs
*Attorney, Agent, or Firm*—Miller & Prestia

[57] ABSTRACT

A highly rigid poly-$\epsilon$-caproamide composition containing about 50 to 5000 ppm of barium combined with the poly-$\epsilon$-caproamide, and having a $\gamma$-type crystal ratio of about 0.3 to 0.7 is disclosed. The polyamide has improved rigidity without loss of other advantageous mechanical properties of poly-$\epsilon$-caprolactam. By addition of an aluminum compound, the rigidity of the composition can be further improved. A bisamide compound may be added to provide excellent mold release without harming the mechanical properties of the composition.

14 Claims, 2 Drawing Figures

HIGHLY RIGID POLYAMIDE COMPOSITION

The present invention relates to a poly-ε-caprolactam (hereinafter referred to as nylon 6) modified to have an improved rigidity, and to a process for preparing the same. Nylon 6 has excellent mechanical properties such as toughness, abrasion resistance and chemical resistance. Utilizing these properties, nylon 6 has heretofore been used for fabricating various shaped articles such as textiles, fishing lines, films, rods, machine parts and containers. Nylon 6 is relatively soft in comparison with polyhexamethylene adipamide (hereinafter referred to as nylon 66). In other words, it is relatively low in rigidity. Therefore, in some end products such as gears and connectors for example, which require high rigidity in addition to toughness and abrasion resistance, nylon 6 is not always a satisfactory material.

In order to improve the rigidity of nylon 6, either an inorganic finely divided nucleating agent such as talc or clay, or a fibrous inorganic reinforcing agent such as glass fibers can be added. However, these additions do not always achieve any remarkable rigidity improvement. Alternatively, in some cases, although rigidity may be highly improved, the toughness of the product becomes extremely deteriorated at the same time. All in all, neither process satisfactorily yields a nylon 6 product having both excellent toughness and rigidity.

An important object of the present invention resides in imparting high rigidity to nylon 6 while maintaining its inherent excellent mechanical properties.

The present invention is directed to a highly rigid poly-ε-caprolactam having excellent mechanical properties, especially toughness, which is inherent in poly-ε-caprolactam. The modified nylon 6 of the present invention comprises nylon 6 containing 50 to 5000 ppm of combined barium, and having a γ-type crystal ratio of 0.3 to 0.7 in its crystalline phase.

Figure 2:
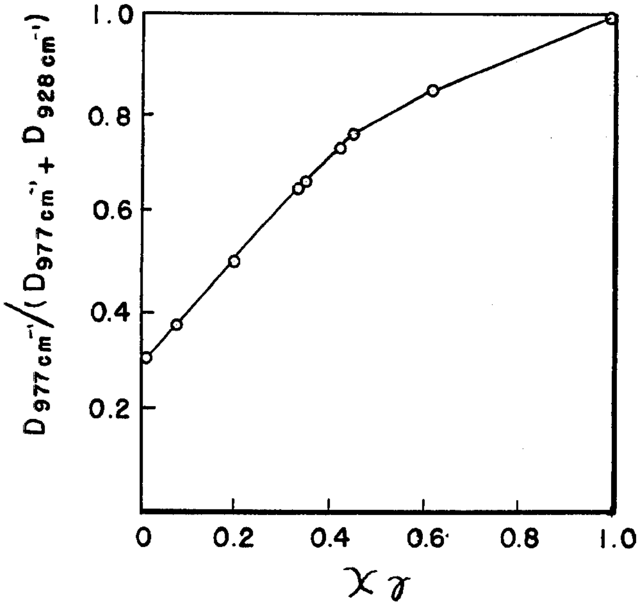

FIGS. 1 and 2 of the drawing are included to show infrared absorption spectrum of slice films of nylon 6 containing combined barium in accordance with the invention.

The γ-type crystal ratio referred to herein is defined as follows. Ordinary nylon 6 consists of an α-type crystalline phase, a γ-type crystalline phase and an amorphous phase. The weight ratio of the γ-type crystal in all crystalline phases (consisting of α-type and γ-type crystals) is identified as the γ-type crystal ratio, and is expressed by $X_\gamma$. Similarly, the α-type crystal ratio is expressed by $X_\gamma$. Therefore $X_\alpha = 1 - X_\gamma$.

The evaluation of $X_\gamma$ is made as follows. A specimen (thickness: 3 mm) is injection molded from nylon 6 using an ordinary in-line screw machine (cylinder temperature 220°-240° C., mold temperature 80° C.) and from this specimen a film, which is 100-200μ thick for infrared spectroscopy, is sliced. The absorption bands at 977 $cm^{-1}$ and 928 $cm^{-1}$ of the infrared absorption spectrum of this sliced film are characteristic of the γ-type and the α-type crystals, respectively. The absorbances of the band at 977 $cm^{-1}$ and 928 $cm^{-1}$ are measured using the base line method shown in FIG. 1, and the value of $D_{977\ cm-1}/D_{977\ cm-1}+D_{928\ cm-1}$ is calculated where $D_{977\ cm-1}$ and $D_{928\ cm-1}$ are absorbances at 977 $cm^{-1}$ and 928 $cm^{-1}$ of the infrared absorption spectrum, respectively. From the calibration curve between $D_{977\ cm-1}/D_{977\ cm-1}+D_{928\ cm-1}$ and $X_\gamma$ (shown in FIG. 2), the value of $X_\gamma$ can be determined. This calibration curve is obtained from the infrared spectrum of the sample piling up of standard films of various thickness which consist of 100% α-type and 100% γ-type crystals. The standard sample of $X_\alpha = 1.0$ is prepared by treating an undrawn film made by use of an inflation method from nylon 6 in boiling water for 2 hours and additionally annealing the same at 195° C. in silicone oil for 2 hours. The standard sample of $X_\gamma = 1.0$ is prepared by immersing said undrawn film in an iodine-potassium iodide aqueous solution (obtained by dissolving 50.8 g of iodine and 50 g of potassium iodide in 200 ml of distilled water) for 48 hours and treating said iodine absorbed film with an aqueous solution of sodium thiosulfate.

It has been well known that nylon 6 forms α-type and γ-type crystals (for example, this was reported by C. W. Bunn, E. V. Cardner in *Proc. Roy. Soc.*, A189, 39 (1979). It has been well known that melt shaped nylon 6 ordinarily has a high α-type crystal ratio. It has also been known that a nylon 6-shaped article having an increased α-type crystal ratio may be produced, when a nucleating agent is added to the nylon 6 to increase the speed of crystallization, or when an ordinary nylon 6-shaped article is annealed to increase the degree of crystallinity. However, it has been discovered that by interaction with barium, a nylon 6 product having a high γ-type crystal ratio can be obtained. Such a novel modified nylon 6 can be made into shaped articles having a very excellent rigidity.

Nylon 6 having a high γ-type crystal ratio of about 0.3 to about 0.7 may be produced by treating ordinary nylon 6, which naturally has a high α-type crystal ratio, with an aqueous solution containing Ba ions, and thereafter, heat melting the treated nylon 6. Such aqueous solution may be prepared by dissolving $Ba(OH)_2$ or BaO in water, for example. Nylon 6, having any desired shape, may be treated with an aqueous 0.01 to 1 normal solution containing Ba ions at an elevated temperature until the nylon 6 absorbs about 50 to 5000 ppm of barium ions. The nylon 6 thus treated may be dried and repelletized before the shaping process is begun. The dried nylon 6 may be fed directly to the shaping step wherein the nylon 6 is once melted; thereby the γ-type crystal ratio is increased.

Another process for preparing nylon 6 having a γ-type crystal ratio of about 0.3–0.7 involves the addition of $Ba(OH)_2$ to a melt-polymerization mixture of ε-caprolactam. Addition of barium ε-aminocaprolate obtained from ε-aminocarboxylic acid and $Ba(OH)_2$ to the polymerization mixture is a useful alternative. In these cases the aqueous solution of $Ba(OH)_2$ may be added to ε-caprolactam containing a small amount of water. After thoroughly mixing the same, the mixture is polymerized by use of any ordinary polymerization process applicable. It is also possible to add the $Ba(OH)_2$ to the polymerization mixture either continuously or batch-wise during the melt-polymerization step. The addition of the barium compound is effective in water-catalyzed, melt-polymerication of ε-caprolactam.

The high-rigidity poly-ε-caprolactam of the present invention which has a high γ-type crystal ratio should also contain barium combined with poly-ε-caprolactam in an amount of about 50–5000 ppm, preferably 500–2000 ppm.

It is not yet well understood by what mechanism the combination of barium with nylon 6 sharply increases the γ-type crystal ratio and at the same time surprisingly imparts high rigidity to the nylon 6-shaped article. However, from the facts that high rigidity is achieved for the first time when nylon 6, treated with an aqueous solution containing barium ions, is once molten, and that only a small amount of barium is extracted when the modified nylon 6 of this invention is reated with hot water, it is considered that the barium reacts chemically with the nylon 6 molecules, or that it has another form of strong interaction therewith, which interaction is not reversed in normal use. The barium does not merely disperse in the nylon 6 composition, in sharp contrast with barium-nylon 6 simple mixtures of the prior art, and it is in this sense that reference is made herein to the term "combined barium".

It has also been found that nylon 6, containing about 50 to 5000 ppm of combined barium and about 2 to 200 ppm of aluminum, and having a $\gamma$-type crystal ratio of from about 0.4 to 0.9, attains the objects of the present invention at an even higher level.

To prepare a further improved nylon 6, an aluminum carboxylate may be added to the above-mentioned nylon 6 containing about 50-5000 ppm of combined barium and having a $\gamma$-type crystal ratio of about 0.3-0.7 so that the amount of Al becomes about 2-200 ppm, preferably about 4-40 ppm. Thereafter, the mixture thus obtained is heated to a molten state.

The aluminum carboxylate herein used may be an aluminum salt of an aliphatic carboxylic acid having about 2 to 20 carbon atoms. Aluminum stearate, aluminum oleate, aluminum acetate and aluminum propionate are preferably used. Aluminum stearate is more preferably used.

The aluminum carboxylate can be added to the modified nylon 6 by use of a conventional process for this purpose. An industrially advantageous process includes dry-blending pellets of the nylon 6 with an aluminum carboxylate in a mixing machine, such as a Henschel mixer for example. The mixture is thereafter heated and kneaded into a molten state, and is then molded into a shaped article. As a further alternative, an aluminum compound may be added to the polymerization mixture together with the barium compound.

Various barium compounds may be used herein, including $Ba(OH)_2$, BaO, and barium salts of an aliphatic carboxylic acid having about 2 to 20 carbon atoms such as barium $\epsilon$-aminocaprolate and barium stearate, for example. The aluminum compounds include aluminum carboxylates such as aluminum stearate and aluminum acetate, and aluminum borate and aluminum hydroxide as well. The aluminum content may be about 2-200 ppm, preferably about 4-40 ppm.

The nylon 6 referred to in this description of the present invention may copolymerize with a small amount of another nylon component or may be mixed with other nylon materials so long as they are not present in such amounts as to be harmful to the characteristics and effects of the present invention. Further, it may similarly contain other additives such as pigments, dyes, heat resistant agents or nucleating agents, for example.

Another characteristic of the present invention resides in use of a specified mold releasing agent for improving the speed of injection molding of the modified nylon 6 without deteriorating the nylon 6 rigidity. Various compounds are known as mold releasing agents for nylon 6. Silicone oil, wax or higher fatty acids or metal salts are representative examples. The injection moldability of the nylon 6 of the present invention is significantly improved with the use of these mold releasing agents, but at the same time, the characteristically high rigidity of shaped articles made of the nylon 6 of the present invention is shaply reduced by such agents.

Mold releasing agents have now been discovered which do not reduce the rigidity of the modified nylon 6 of the present invention. They are bisamide compounds.

The peculiar effect and action of bisamide compounds cannot be observed on shaping ordinary nylon 6, but they are revealed for the first time by the combination of such compounds with the nylon 6 of the present invention. Useful bisamide compounds are compounds represented by the general formula:

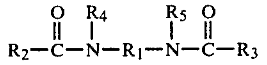

or

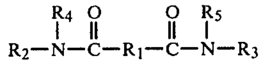

wherein $R_1$ denotes a divalent hydrocarbon group having about 1-10 carbon atoms, $R_2$ and $R_3$ denote monovalent hydrocarbon groups having about 10-30 carbon atoms, and $R_4$ and $R_5$ denote hydrogen or monovalent hydrocarbon groups having 1-4 carbon atoms.

Representative examples of bisamide compounds include methylene-bis-stearylamide, ethylene-bis-stearylamide and distearyl-adipamide. One or a combination of at least two of these bisamide compounds may be used, the added amount thereof being suitably about 0.005-1 part by weight, especially 0.02-0.5 part by weight based on 100 parts by weight of nylon 6.

Various methods are available for mixing the nylon 6 of the present invention with said bisamide compound. These include adding bisamide to the surfaces of nylon 6 pellets by use of an ordinary blender such as a Henschel mixer or a tumbler. Also included is the step of melt-kneading the two using an extruder, and also included is the step of mixing nylon 6 master pellets having a high concentration of an amide compound with nylon 6 pellets not containing an amide compound before shaping, and finally adjusting the concentration to the desired concentration.

In the following examples and comparative examples, mechanical properties are measured according to ASTM D-638 and D-790.

Shapability is determined by continuously injection molding a 13×30×25 mm box-like shaped article having a partition inside, and determining whether the shaped article can automatically and continuously release from the mold during 60 minutes of testing time. The molding conditions are as follows: resin temperature 260° C., mold temperature 80° C. and shaping cycle 30 seconds.

The following examples are illustrative of preferred ways of carrying the invention into effect. They are not intended to limit the scope of the invention, which is defined in the appended claims.

EXAMPLE 1

Poly-$\epsilon$-caprolactam was continuously polymerized at 250°-265° C., with a VK tube-type reactor, and the polymer was discharged from the bottom using a gear pump and was cut into pellets.

3 Kg. of these pellets were treated with 30 liters of an aqueous solution containing 0.05% of barium hydroxide ($Ba(OH)_2$) at 90°-95° C. for 10 hours to extract low molecular weight compounds, and at the same time to impregnate the polymer with $Ba(OH)_2$.

The polymer was dried at 105° C. for 24 hours in vacuo. The resulting nylon 6 was white and opaque, and its relative viscosity, measured at 25° C. on a 98% sulfuric acid solution (1 g polymer in 100 ml solvent), was 2.7. The amount of combined barium in this polymer was 630 ppm. The mechanical properties of the polymer and the γ-type crystal ratio $X_\gamma$ measured from an infrared absorption spectrum appear in Table 1.

EXAMPLE 2 AND COMPARATIVE EXAMPLE 1

Similarly, 3 kg of nylon 6 pellets were treated with an aqueous solution containing 0.1% of barium hydroxide, and with water not containing barium hydroxide, respectively, and products obtained included (a) nylon 6 containing 1880 ppm of combined barium and (b) nylon 6 containing no barium. The mechanical properties and $X_\gamma$ values of these nylon 6 products are described in Table 1.

TABLE 1

| | Amount of Combined Barium (ppm) | $X_\gamma$ Ratio | Tensile Yield Strength ($kg/cm^2$) | Tensile Elongation at Break (%) | Flexural Modulus ($kg/cm^2$) |
|---|---|---|---|---|---|
| Example 1 | 630 | 0.51 | 870 | 165 | 28300 |
| Example 2 | 1880 | 0.68 | 890 | 151 | 29800 |
| Com. Ex. 1 | 0 | 0.23 | 790 | 200 | 25600 |

From Table 1 it is clear that nylon 6 containing combined barium and having a large $X_\gamma$ is excellent in tensile strength and flexual modulus.

EXAMPLE 3

A mixture of 25 kg of ε-caprolactam, 25 g of $Ba(OH)_2$, and 4 kg of distilled water was charged into an autoclave equipped with a stirrer. Air inside the autoclave was discharged with nitrogen and thereafter, the autoclave was closed and heated to 260° C. with stirring while maintaining the pressure at 15 $kg/cm^2$ G. The pressure was reduced to atmospheric pressure in 2 hours, and polymerization was completed at 260° C. while nitrogen was flashed into the gaseous phase inside the autoclave for 1 additional hour. The polymer was discharged, cut into pellets, treated with hot water in an amount of 10 times the amount of the polymer to extract low molecular weight compounds, and was dried in vacuo at 100° C. for 24 hours.

This nylon 6 had a relatively viscosity of 2.6, a barium content of 650 ppm and an $X_\gamma$ ratio of 0.51. An injection molded article of this nylon 6 had a tensile yield strength of 820 $kg/cm^2$, a tensile elongation break of 165% and a flexual modulus of 28300 $kg/cm^2$.

EXAMPLES 4-9 AND COMPARATIVE EXAMPLES 2-4

To nylon 6 pellets containing 600 ppm of combined barium and having an $X_\gamma$ ratio of 0.51, obtained in the same manner as in Example 1, was added aluminum di-stearate in such amounts that the aluminum contents were as reported in Table 3, Examples 4-7. The mixtures were well mixed and were then injection molded. The $X_\gamma$ ratios and the mechanical properties of these polymers are shown in Table 2.

Example 8 shows the properties of a nylon 6 composition wherein cuprous iodide was added to the nylon 6 in an amount of 0.03%, based on the nylon 6, as a heat resistant agent.

Example 9 shows the physical properties of nylon 6 wherein basic aluminum acetate was added to the nylon 6 pellets obtained in the same manner as in Example 3, having a relative viscosity of 2.6 and containing 580 ppm of combined barium.

Comparative Examples 2 and 3 show the physical properties of compositions wherein 0.05% of calcium stearate (CSL) and 0.05% of barium stearate (BSL) were added repsectively to nylon 6 having an $X_\gamma$ ratio of 0.51 used in Examples 4-7. Different from aluminum stearate, these additives deteriorate the inherent rigidity of the composition of this invention.

Comparative Example 4 shows that when aluminum stearate was added to ordinary nylon 6 the rigidity was low.

TABLE 2

| | Additive | | | | | |
|---|---|---|---|---|---|---|
| | Ba (ppm) | Al (ppm) | $X_\gamma$ Ratio | Tensile Yield Strength ($kg/cm^2$) | Tensile Elongation at Break (%) | Flexural Modulus ($kg/cm^2$) |
| Example 4 | 600 | 4 | 0.63 | 880 | 234 | 30800 |
| Example 5 | 600 | 13 | 0.63 | 870 | 201 | 31500 |
| Example 6 | 600 | 22 | 0.54 | 870 | 159 | 31200 |
| Example 7 | 600 | 44 | 0.46 | 860 | 169 | 30000 |
| Example 8 | 600 | 13 (CuI) | 0.56 | 880 | 170 | 30300 |
| Example 9 | 580 | 17 | 0.52 | 860 | 173 | 29700 |
| Com. Ex. 2 | 600 | — (CSL) | 0.38 | 820 | 250 | 27300 |
| Com. Ex. 3 | 600 | — (BSL) | 0.45 | 820 | 230 | 27800 |
| Com. Ex. 4 | 0 | 13 | 0.25 | 780 | 172 | 25700 |

EXAMPLES 10-14 AND COMPARATIVE EXAMPLES 5-6

By the method described in Example 3, but varying the kind and amount of the barium compound and the aluminum compound, these were added to ε-caprolactam and the mixtures were polymerized. The characteristics of the nylon 6 obtained are summarized in Table 3.

The amounts of barium and aluminum in Table 3, except Comparative Example 6, show the amounts added to ε-caprolactam before polymerization thereof. The actual contents of barium and aluminum in polymerized nylon 6 are about 10% less than those amounts, because a part of barium and aluminum is extracted during the monomer-oligomer extraction step.

Comparative Example 5 shows that the nylon 6, which contained the aluminum compound only, did not have recognizable improvement of rigidity.

Comparative Example 6 shows that when the barium compound and aluminum compound were added to ordinary nylon 6 pellets and the mixture was injection molded, improvement of rigidity, as observed in the case of adding these compounds to the ε-caprolactam polymerization stage, was not recognized.

TABLE 3

| | Additive | | | | $\eta_r$ | $X_\gamma$ Ratio | Tensile Yield Strength ($kg/cm^2$) | Tensile Elongation at Break (%) | Flexural Modulus ($kg/cm^2$) |
|---|---|---|---|---|---|---|---|---|---|
| | Barium (ppm) | | Aluminum (ppm) | | | | | | |
| Example 10 | $Ba(OH)_2$ | (800) | ASL | (13) | 2.66 | 0.65 | 890 | 180 | 31500 |
| Example 11 | BSL | (780) | AAC | (167) | 2.65 | 0.75 | 890 | 172 | 31800 |
| Example 12 | BSL | (780) | ABO | (300) | 2.68 | 0.68 | 890 | 150 | 32000 |
| Example 13 | BSL | (780) | ASL | (4) | 2.68 | 0.60 | 860 | 205 | 31300 |
| Example 14 | BSL | (780) | ASL | (13) | 2.68 | 0.88 | 880 | 180 | 31000 |
| Com. Ex. 5 | — | | ASL | (177) | 2.69 | 0.25 | 790 | 180 | 26000 |
| Com. Ex. 6 | BSL | (780) | ASL | (44) | 2.70 | 0.22 | 770 | 195 | 26800 |

EXAMPLES 15-18 AND COMPARATIVE EXAMPLES 7-12

Various mold releasing agents were added to nylon 6 pellets prepared by the same processes as in Example 1 and Example 5 (each in an amount of 0.1 part per 100 parts of the polymer), and the injection moldability and mechanical properties of the products were checked.

The results are summarized in Table 4. Improvement of the moldability was recognized by addition of the mold releasing agents, but it was clarified that the improved rigidity, which was the characteristic, of the present invention was retained only when a mold releasing agent of a bisamide compound was used.

TABLE 4

| | Nylon | Mold Releasing Agent | $X_\gamma$ Ratio | Tensile Yield Strength ($kg/cm^2$) | Tensile Elongation at Break (%) | Flexural Modulus ($kg/cm^2$) | Shapability |
|---|---|---|---|---|---|---|---|
| Example | | | | | | | |
| 15 | Prepared as in Example 1 | Ethylene-bis-stearylamide | 0.49 | 800 | 161 | 29000 | Good |
| 16 | Prepared as in Example 1 | Methylene-bis-stearylamide | 0.49 | 800 | 155 | 29100 | Good |
| Com. Ex. | | | | | | | |
| 7 | Prepared as in Example 1 | — | 0.50 | 800 | 160 | 29000 | There was deformation in the shaped article. |
| 8 | Prepared as in Example 1 | Stearic acid | 0.23 | 730 | 230 | 26600 | Good |
| 9 | Prepared as in Example 1 | Zinc Stearate | 0.23 | 730 | 220 | 26600 | Good |
| 10 | Prepared as in Example 1 | Montan wax[a] | 0.22 | 730 | 230 | 26600 | Good |
| Example | | | | | | | |
| 17 | Prepared as in Example 1 | Ethylene-bis-stearylamide | 0.69 | 830 | 131 | 31300 | Good |
| 18 | Prepared as in Example 1 | Methylene-bis-stearylamide | 0.69 | 830 | 126 | 31400 | Good |
| Com. Ex. | | | | | | | |
| 11 | Prepared as in Example 1 | 13 | 0.69 | 830 | 147 | 31300 | There was deformation in the shaped article. |
| 12 | Prepared as in Example 1 | Stearic acid | 0.25 | 740 | 221 | 26900 | Good |
| 13 | Prepared as in Example 1 | Calcium Stearate | 0.23 | 730 | 220 | 26700 | Good |
| 14 | Prepared as in Example 1 | Zinc Stearate | 0.25 | 730 | 217 | 26900 | Good |
| 15 | Prepared as in Example 1 | Montan wax[a] | 0.24 | 730 | 218 | 26800 | Good |

[a] "Hoechst Wax" E, manufactured by Hoechst of Germany.

What we claim is:

1. A highly rigid polyamide which comprises poly-ε-caprolactam containing about 50 to 5000 ppm of combined barium, said barium combined with the poly-ε-caprolactam, and having a γ-type crystal ratio of about 0.3 to 0.7 in the crystalline phase.

2. A polyamide composition of claim 1 wherein the amount of combined barium is 500 to 2000 ppm.

3. A highly rigid polyamide which comprises poly-ε-caprolactam containing about 50 to 5000 ppm of barium and about 2 to 200 ppm of aluminum, at least said barium being combined with the poly-ε-caprolactam, and having a γ-type crystal ratio of about 0.4 to 0.9 in the crystalline phase.

4. A highly rigid polyamide of claim 3 wherein the amount of aluminum is 4 to 40 ppm.

5. A highly rigid polyamide molding composition which comprises 100 parts by weight of poly-ε-caprolactam containing about 50 to 5000 ppm of barium, said barium being combined with the poly-ε-caprolactam, and having a γ-type crystal ratio of about 0.3 to 0.7 in the crystalline phase and about 0.005 to 1 part by weight of a bisamide compound represented by the following general formula

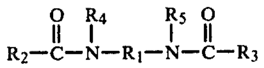

or

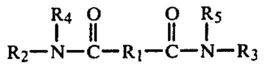

wherein $R_1$ represents a divalent hydrocarbon group having 1 to 10 carbon atoms, $R_2$ and $R_3$ represent monovalent hydrocarbon groups having 10 to 30 carbon atoms, and $R_4$ and $R_5$ represent hydrogen or a monovalent hydrocarbon group having 1 to 4 carbon atoms.

6. A highly rigid polyamide molding composition which comprises 100 parts by weight of poly-ε-caprolactam containing about 50 to 5000 ppm of barium and about 2 to 200 ppm of aluminum, at least said barium being combined with the poly-ε-caprolactam, and having a γ-type crystal ratio of about 0.4 to 0.9 in the crystalline phase and about 0.005 to 1 part by weight of a bisamide compound represented by the following general formula

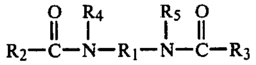

or

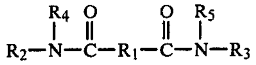

wherein $R_1$ represents a divalent hydrocarbon group having 1 to 10 carbon atoms, $R_2$ and $R_3$ represent monovalent hydrocarbon groups having 10 to 30 carbon atoms, and $R_4$ and $R_5$ represent hydrogen or monovalent hydrocarbon groups having 1 to 4 carbon atoms.

7. A process for producing a highly rigid polyamide which comprises treating poly-ε-caprolactam with an aqueous solution containing barium ions, said solution having a normality of about 0.01 to 1, heating the treated poly-ε-caprolactam to the molten state, and solidifying the same.

8. A process for producing a highly rigid polyamide which comprises melt-polymerizing ε-caprolactam to poly-ε-caprolactam in the presence of a barium compound selected from the group consisting of barium-ε-caprolate and $Ba(OH)_2$ wherein a poly-ε-caprolactam having γ-type crystal ratio of about 0.3 to 0.7 in the crystalline phase is obtained.

9. A process for producing a highly rigid polyamide which comprises melt-blending poly-ε-caprolactam containing about 50 to 5000 ppm of barium, said barium being combined with the poly-ε-carpolactam, and having a γ-type crystal ratio of about 0.3 to 0.7 with an aluminum salt of an aliphatic carboxylic acid having about 2 to 20 carbon atoms.

10. A process for producing a highly rigid polyamide which comprises melt-polymerizing ε-caprolactam to poly-ε-caprolactam in the presence of a barium compound selected from the group consisting of $Ba(OH)_2$ and barium salts of an aliphatic carboxylic acid having about 2 to 20 carbon atoms and an aluminum compound selected from the group consisting of aluminum salts of an aliphatic carboxylic acid having about 2 to 20 carbon atoms, aluminum borate and aluminum hydroxide.

11. The process according to claim 10 wherein a poly-ε-caprolactam having γ-type crystal ratio of about 0.3 to 0.7 in the crystalline phase is obtained.

12. The process according to claim 10 wherein a poly-ε-caprolactam containing 2 to 200 ppm of said aluminum salt is obtained.

13. The process for producing a highly rigid polyamide which comprises melt-polymerizing ε-caprolactam to poly-ε-caprolactam in the presence of a barium compound selected from the group consisting of barium-ε-caprolate and $Ba(OH)_2$ so as to produce a poly-ε-caprolactam containing about 50 to 5,000 ppm of combined barium.

14. The process for producing a highly rigid polyamide which comprises melt-polymerizing ε-caprolactam to poly-ε-caprolactam in the presence of a barium compound selected from the group consisting of $Ba(OH)_2$ and barium salts of an aliphatic carboxylic acid having about 2 to 20 carbon atoms and an aluminum compound selected from the group consisting of aluminum salts of an aliphatic carboxylic acid having 2 to 20 carbon atoms, aluminum borate and aluminum hydroxide so that the resulting poly-ε-carprolactam contains about 50 to 5,000 ppm of barium.

* * * * *